United States Patent [19]
Niehaus et al.

[11] 3,821,918
[45] July 2, 1974

[54] MOTORIZED MITER BOX

[75] Inventors: Edward J. Niehaus; Harry D. Benney, both of Tupelo, Miss.

[73] Assignee: Rockwell International Corporation, Pittsburgh, Pa.

[22] Filed: Sept. 1, 1972

[21] Appl. No.: 285,654

[52] U.S. Cl................ 83/471.3, 83/478, 83/477.1, 83/490
[51] Int. Cl.......................... B27b 5/18, B23d 45/14
[58] Field of Search....... 83/471.3, 471.2, 490, 478, 83/477.1, 468, 477, 574; 267/173

[56] References Cited
UNITED STATES PATENTS

| | | | |
|---|---|---|---|
| 3,120,973 | 2/1964 | Ramsey | 267/173 |
| 3,483,901 | 12/1969 | Ray | 83/471.3 |
| 3,570,564 | 3/1971 | Bergler | 83/471.3 |
| 3,574,315 | 4/1971 | Boultinghouse | 83/490 |

FOREIGN PATENTS OR APPLICATIONS

| | | | |
|---|---|---|---|
| 627,432 | 11/1961 | Italy | 83/471.3 |

*Primary Examiner*—Donald R. Schran

[57] ABSTRACT

A motorized miter box including a support base mounting an angularly adjustable support arm the rear end of which carries a forwardly and downwardly swingable motor driven saw means and the front end of which extends beyond and upwardly and inwardly around the arcuate web-run to form pointer means and quick acting detent means for adjustably setting the support arm to the frequently used miter cutting angles. The support for the swingable motor driven saw means includes compression spring biasing means for maintaining the motor driven saw means in its upper rest position including guide means for supporting the biasing spring, in event of spring failure, in partial operative position to arrest movement of the motor driven saw means to its operative position thereby assuring the operator against injury.

4 Claims, 5 Drawing Figures

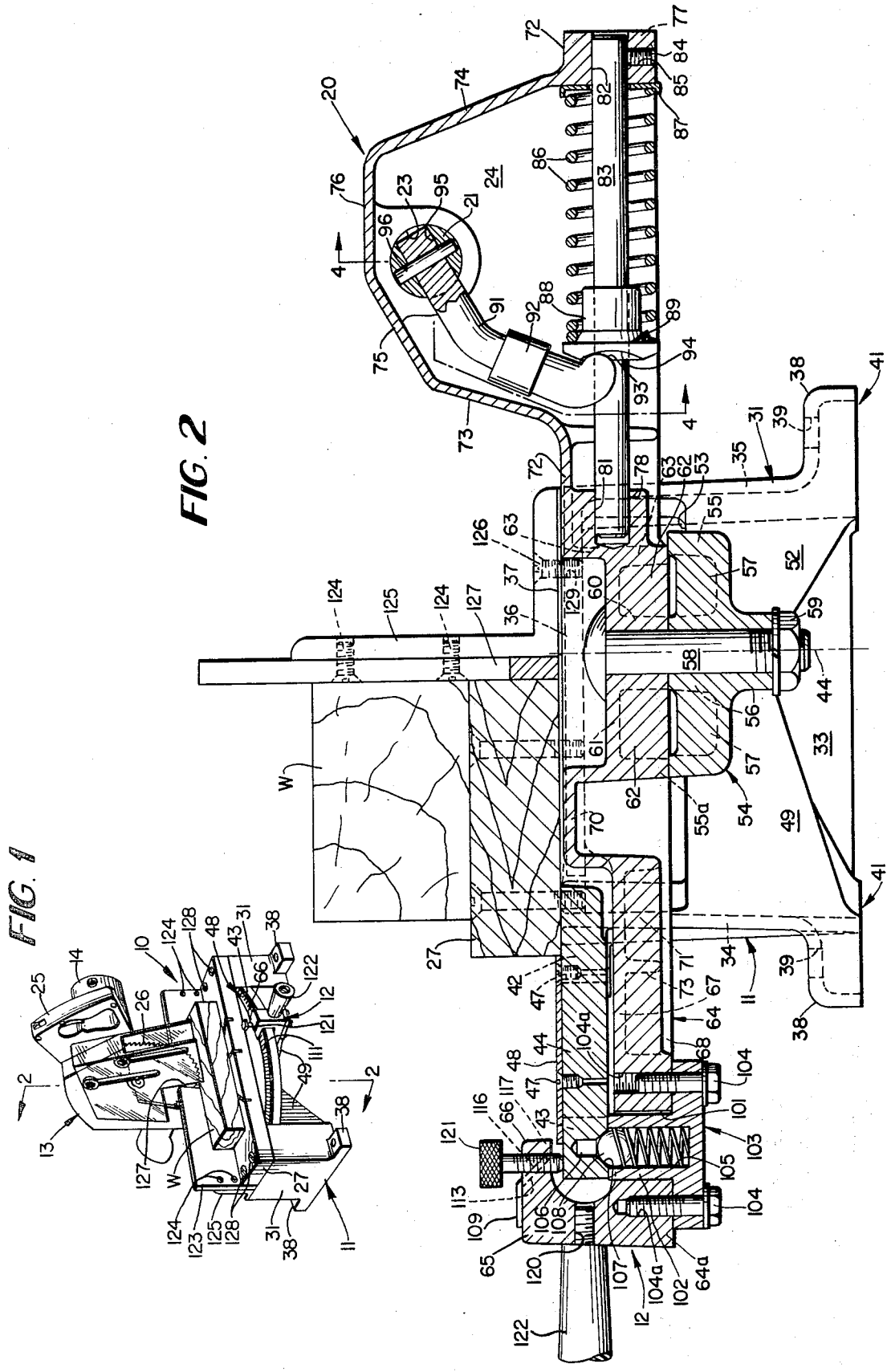

MOTORIZED MITER BOX

BACKGROUND OF THE INVENTION

The present invention relates to motorized miter boxes in which a power driven saw, usually a circular saw, is pivotally supported on a support member for vertical swinging movement downwardly from a normal inoperative rest position toward a work support base structure which pivotally supports the support member on a vertical axis for angular swinging movement to preselected angular positions to effect a desired angle cutting of the workpiece. Typical prior art devices of this general type are disclosed by U.S. Pat. Nos. 1,203,417 issued Oct. 31, 1916, to Schade et al; 1,332,714 issued Mar. 2, 1920, to D'Arcy; 1,952,518 issued Mar. 27, 1937, to Stowell; 2,589,554 issued Mar. 18, 1952, to Killian; 3,384,135 isued May 21, 1968, to Frydenlund and by the motorized miter box marketed by Rockwell Manufacturing Company, assignee of the present application, and illustrated, for example, at section G4a, pages 1 through 4 of its May, 1970 catalogue of Rockwell Delta Industrial Machines. Common problems of these prior art machines relate to the time involved in setting the desired angular cuts, the accuracy of the settings, particularly after substantial usage, the repair cost occasioned by breakage of the setting mechanism, the stability of the base support structure and, where the saws are biased to a normal inoperative rest position, usually by a coiled tension spring, the danger of operator injury in event of spring breakage. The present invention is directed particularly to correcting these problems.

SUMMARY OF THE INVENTION

It is a primary object of this invention to provide a motorized miter box with an improved base structure assuring greater stability in use, an improved angularly adjustable motor driven saw support arm assuring quick accurate setting to the most frequently used angular settings and an improved spring biasing means for maintaining the motor driven saw means in its normal rest position in spite of structural failure of the spring to better protect the operator in using the miter box.

A further object of the present invention resides in disposing the opposite end of the laterally swingable support member of the preceeding object to pass beneath the web-like structure and provide an upstanding, inturned hook shaped formation arranged to overhang the outer marginal edge of the arcuate web-run and mount a set screw engageable with the opposing upper marginal edge surface to secure the laterally swingable support member in any selected angular setting and also provide an end opening notch delimited at its inner end by an axially outwardly inclined, surface to receive a pointer member having a downwardly inclined pointer section overlying the axially outwardly inclined surface with one side edge abutting the axially directed notch side wall and a pointer tip directed inwardly along the medial plane for registry with angular markings inscribed on an arcuate scale plate fixed to the upper surfaces of the web-like structure in radial relation to the journal axis.

A still further object of the present invention resides in providing the laterally swingable support arm of the preceeding objects with an upstanding housing at its one end having opposite side walls formed to journal a cross shaft adjacent their upper ends for rotation on an axis normal to the medial plane of the base structure with one end protruding from one housing side wall to fixedly mount the motor driven saw means for movement downwardly from an inoperative rest position to its cutting position and opposed end walls providing respective shaft bores coaxially aligned in the vertical plane containing the longitudinal axis of the laterally swingable support arm fixedly receiving the opposite ends of a support shaft extending axially through a coil compression spring disposed in end butting relation to one housing end wall with its opposite end guidingly fitted to the hub of a cross arm the protruding arms of which are suitably recessed to abutingly engage the bifurcated ends of a depending arm the opposite end of which is fixedly secured to the cross shaft to transmit the biasing force of the coil compression spring to the cross shaft to normally maintain the motor driven saw means in its rest position and, in event of structural failure of the compression spring, to constrain the motor driven saw means against movement from its normal rest position thereby preventing injury of the operator in his normal operation of the motorized miter box.

BRIEF DESCRIPTION OF THE DRAWINGS

Further objects will appear from the following description and appended claims when read in conjunction with the accompanying drawings wherein:

FIG. 1 is a perspective view of a motorized miter box embodying the present invention;

FIG. 2 is a vertical sectional view taken substantially on line 2—2 of FIG. 1 looking in the direction of the arrows illustrating the swingable support arm and its pivot connection to the base member of FIG. 1;

DESCRIPTION OF PREFERRED EMBODIMENT

Figure 3:
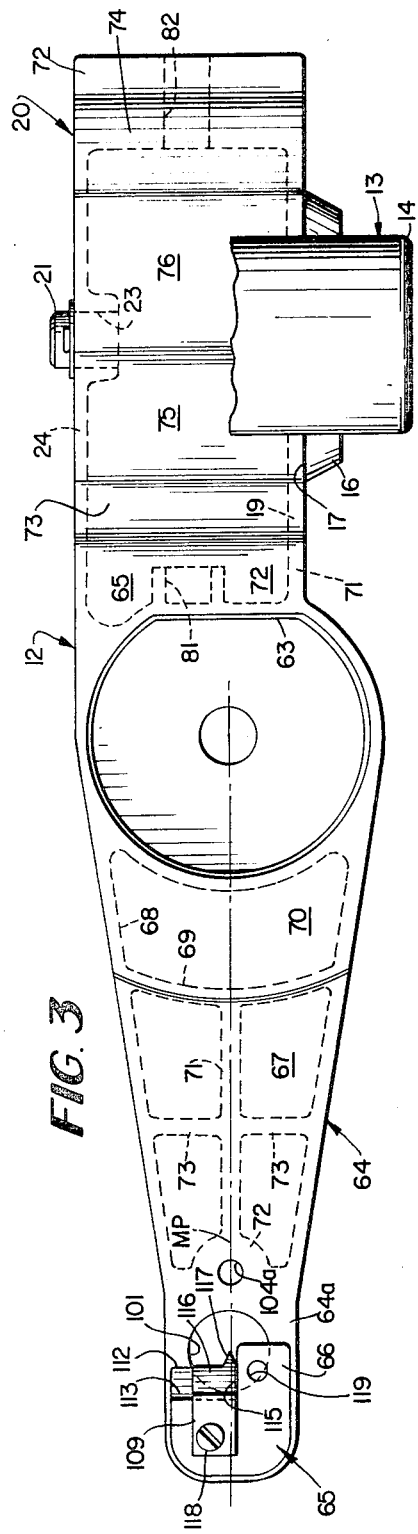
FIG. 3 is a top plan view of the laterally swingable support arm of FIG. 2.

With continued reference to the drawings wherein the same reference numerals are employed throughout the several views to indicate the same parts, the motorized miter box of this invention is generally indicated by the numeral 10. The motorized miter box 10 is made up of three principal parts, namely, a base structure 11, a laterally swingable support arm or member 12 journalled on base structure 11 for swinging movement around a vertical axis, and a motor driven saw means 13 journalled on laterally swingable support member 12 for swinging movement around a horizontal axis. The present invention is directed to the provision of a more stable base structure 11, an improved laterally swingable support member 12 for carrying the motor driven saw means 13, which is of generally conventional structure and will not be described in detail, and an improved biasing spring means for returning the motor driven saw means 13 to its normal inoperative rest position and preventing its inadvertent movement to operative position upon structural failure of the spring. Suffice it to say that the motor driven saw means 13 includes a motor housing 14 having a dependent support arm 15 (FIG. 4) the free end of which merges into an enlarged diameter circular pad 16 (FIGS. 3 and 4) the planar face 17 of an equal diameter circular pad 18 formed as an integral part of side wall 19 (FIG. 4) of a housing 20 integrally formed as a part of laterally swingable support member 12 to be presently described in detail.

Referring for the moment to FIGS. 1, 2, 3 and 4, motor driven saw means 13 is supported by dependent arm 15 fixed to one end of a cross shaft 21 journalled in opposed coaxial journal bores 22 and 23 formed in the upper portions of the side walls 19 and 24 (FIG. 4) of housing 20. In use, the hand grip 25 (FIG. 1) fitted with a finger operated trigger switch (not shown), is grasped by the operator to swing the motor driven saw means 13 downwardly in a clockwise direction as viewed in FIG. 1 to feed the saw blade 26 through a workpiece W supported on a nonmetalic, preferably wooden, support block 27 fixed to base structure 11 in a manner to be presently described. The motor driven saw means 13 is normally spring biased to its inoperative rest position illustrated in FIG. 1 by spring biasing means 28 (FIGS. 2 and 4) forming an important part of this invention.

Figure 5:
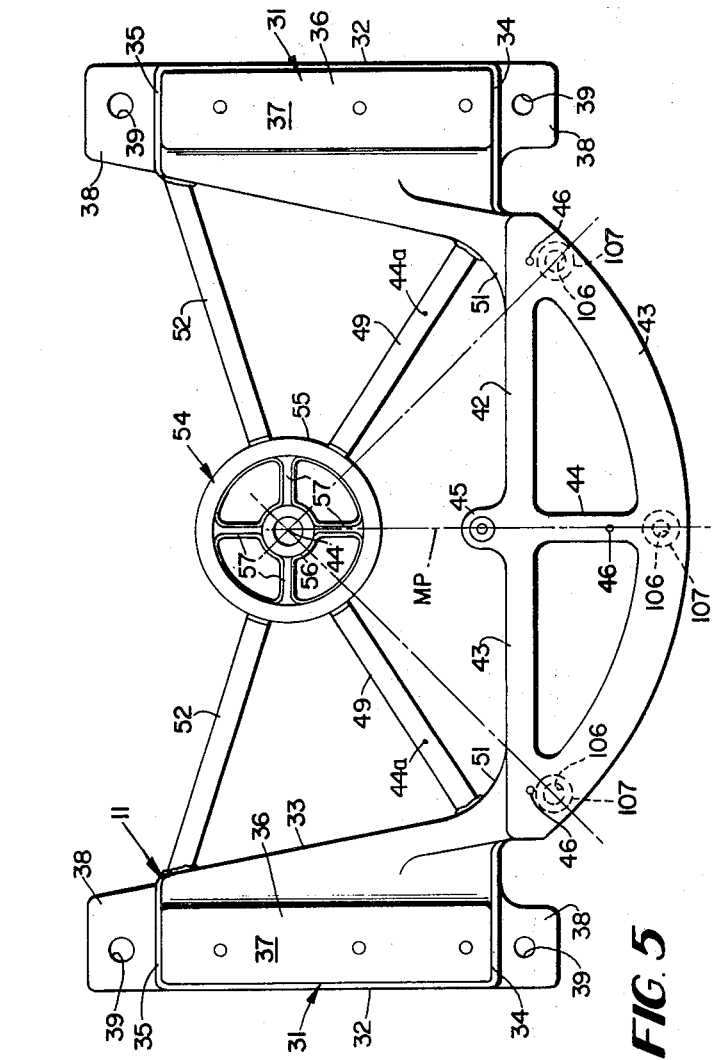
FIG. 5 is a top plan view of the base structure of FIGS. 1 and 2.

In order to assure safe operation of motor driven saw means 13 and to properly accommodate the swinging movement just described and properly distribute the weight components of motor driven saw means 13 and its support structure, including the laterally swingable support member 12, base structure 11 (See FIGS. 2 and 5) and support member 12 are formed as one piece castings, preferably shell-like castings to minimize the overall weight of the miter box. As best seen in FIG. 5, base structure 11 comprises widely laterally spaced, elongated side support members 31 disposed in generally parallel relation each formed to provide parallel outer side walls 32 and inwardly spaced forwardly diverging inner side walls 33 joined at their opposite ends by respective end walls 34 and 35 and along their upper edges by top walls 36 formed to provide axially elongated, machined, planar mounting pads 37. The end walls 34, 35 as best seen in FIG. 2, turn axially outwardly at their lower ends to provide axially extending support feet 38 through apertured at 39 to receive hold down bolts (not shown) if desired. The lower support edges 41 of support feet 38 are extended axially inwardly along the lower edges of inner and outer side walls 32, 33 as best seen in FIG. 2 to provide abutment faces of substantial length and area the outer ends of which protrude beyond the end walls 34, 35 to assure fore and aft stability of base structure 11 in use.

Side support members 31 are rigidly interconnected at the opposed upper corners at their wider ends by cross webbing consisting of a laterally directed run 42 and an arcuate run 43 generated around a vertical axis 44 (FIGS. 2 and 5) lying in the medial plane MP between side support members 31 offset toward the rearward ends of side members 31 for a purpose to be presently pointed out. Web runs 42 and 43 along the aforesaid medial plane are interconnected by an axially directed reinforcing web 44. Run 42 opposite reinforcing web 44 is also provided with an inwardly protruding boss 45 centered relative to the aforesaid medial plane. The upper faces of web runs 42, 43, and boss 45 are machined to form mounting surfaces which are coplanar to the machined surfaces of mounting pads 37. Reinforcing web 44 and the opposite ends of web run 42 are tap drilled at 46 (FIG. 5) to receive securing screws 47 (FIG. 2) for attaching a scale plate 48, divided in degrees, on the machined surfaces of web runs 42 and 43. As will be clear from FIGS. 1 and 2, scale plate 48 is delimited along its outer edge along an arcuate path having axis 44 as its center and covers only the inner half of arcuate web 43 leaving the outer half exposed for a purpose to be presently described. Scale plate 48 is graduated in opposite directions from the medial plane defined by axis 44 from a zero degree radian lying in the medial plane to 45° in each direction.

Referring again to FIGS. 2 and 5, the side support members 31 of base structure 11 include integral support ribs 49 extending inwardly along radial planes defined by axis 44 and the vertical centers 44a of the merging arcs 51 between inner side walls 33 and web run 42 (FIG. 5) and integral support ribs 52 extending inwardly along radial planes defined by axis 44 and intersecting inner side walls 33 at the rear ends of inner walls 33. The lower edges of these ribs, as will be apparent from FIG. 2, join inner walls 33 at a point just above the support surfaces 41 of feet 38 while their upper edges 53 lie in a horizontal plane spaced a substantial distance below the plane defined by the under surfaces of web runs 42 and 43. At their inner ends, ribs 49 and 52 merge to form a cup-like member 54 the annular wall 55 of which is concentric with axis 44 and projects upwardly slightly beyond the upper edges of the ribs and the end wall of which mounts oppositely directed hub-like journal bosses 56 defining a vertically directed journal bore having as its axis the axis 44. The free end of upper journal boss 56 and the upwardly protruding end face of annular wall 55 are machined to provide abutment bearing surfaces in a common plane normal to axis 44 and parallel to the surfaces of mounting pads 37 and the machined surfaces of web runs 42, 43 and boss 45. Upper journal boss 56 is reinforced by diametrically opposed strengthening ribs 57 merging into annular wall 55.

Swingable support member 12 is formed with a depending hub-like journal boss 60 providing a through journal bore dimensioned to have a journal fit with a headed pivot pin 58 (FIG. 2) entered downwardly through journal boss 60 and journal bosses 56 of base structure 11 to journal support member 12 on base structure 11. Journal boss 60 depends from partition wall 61, is provided with a machined end face dimensioned to abuttingly slidingly engage the similarly machined end face of upper journal boss 56 of base structure 11 and is reinforced by diametrically opposed intersecting ribs 62, similar to ribs 57 of base structure 11. Ribs 62 merge at their outer ends into a arcuate skirt or wall 55a extending throughout a 300° arc coaxially related to boss 60 to intersect a chordally directed planar wall 63 disposed to the right of boss 60 (FIGS. 2 and 3) and normal to the longitudinal axis of support member 12. The arcuate wall 55a defines an end face machined to slidingly abut the opposing end face of annular wall 55 of base structure 11 to resist the tilt forces imposed on support member 12 in use. To assure proper light bearing contact between the abutting end faces of bosses 60 and 56 and the depending arcuate wall 55a and upstanding annular wall 55, the lower end of the shank of pivot pin 58 is preferably threaded and fitted with a nut and thrust washer assembly 59 operative to retain the bearing surfaces of support member 12 in light bearing contact with the opposed bearing surfaces of base structure 11. If desired, a cotter pin or other locking device may be provided to maintain the nut of nut and washer assembly 59 in adjusted position.

As best seen in FIG. 2 arcuate skirt 55a and planar wall 63 extend upwardly past partition wall 61 to define an upwardly opening recess surrounding the head of pivot pin 58.

One end of support member 12, the left end as viewed in FIGS. 2 and 3, extends longitudinally in laterally centered relation to the longitudinal axis of support member 12 to provide an arm 64 shaped and dimensioned to clear and extend beneath and beyond the scale plate supporting webs 42 to 44. The major portion of arm 64 extending from arcuate wall 55a to a point inwardly of web 43 comprises a shell-like casting while terminal portion 64a is solid and formed at its outer end to provide an upstanding, inturned hook formation 65 having an inturned leg 66 overhanging the outer marginal edge of web 43. Arm 64, between end portion 64a and the pivotal connection provided by boss 60, includes a first section immediately adjacent terminal portion 64a defined by a planar, inwardly divergent, top wall 67 and opposed depending planar side walls 68 delimited radially inwardly of boss 45 of base structure 11 by a laterally directed, arcuate reinforcing rib 69 the upper edge of which projects upwardly from top wall 67. Rib 69 also delimits the outer end of a second inwardly divergent top wall 70 having opposed depending planar side walls forming a heightened extension of side walls 68 and tangentially intersecting arcuate wall 65. Arcuate reinforcing rib 69 is also intersected along the longitudinal axis of arm 64 by a laterally centered, reinforcing rib 71 depending from top wall 67 and extending longitudinally between rib 71 and the opposing rounded end 72 (FIG. 3) of terminal portion 64a of arm 64. Respective laterally opposed reinforcing webs 73 intersect rib 71 midway between its end and the opposed portions of side walls 68.

The opposite end of support member 12 extends longitudinally in the opposite direction from arcuate wall 55 and is shaped to define housing 20 delimited along its opposite sides by side walls 19 and 24 lying in a plane parallel to the longitudinal axis of support member 12 and respectively intersecting arcuate wall 55a at its line of juncture with chordal wall 63 and tangentially merging into arcuate wall 55a generated around axis 44. Opposed housing side walls 19 and 24 generally parallel the longitudinal axes of support member 12 and are of varying height between spaced end sections 71 delimited by top walls 72 disposed in co-planar relation to top wall 70. Immediately adjacent end sections 71, top walls 72 merge into upwardly and inwardly sloping side wall delimiting wall sections 73 and 74 which in turn merge into a lesser inclined delimiting wall section 75 and a final wall section 76 parallel to top walls 72.

Midway between side walls 19 and 24 chordal wall 63 and the opposed end wall 77 of housing 20 are provided with opposed axially directed bosses 78 and 79 merging into top walls 72 and respectively blind drilled and through drilled to provide coaxially related rod support bores 81 and 82. Bores 81 and 82 supportingly receive the opposite ends of a guide rod 83 extending at right angles to cross shaft 21 carrying motor driven saw means 13 and forming an essential part of the spring biasing means 28 of this invention. Rod 83 is fixedly secured in bores 81 and 82 by a set screw 84 entered in a tapped passage 85 intersecting bore 82 and opening through the underside of boss 79.

Figure 4:
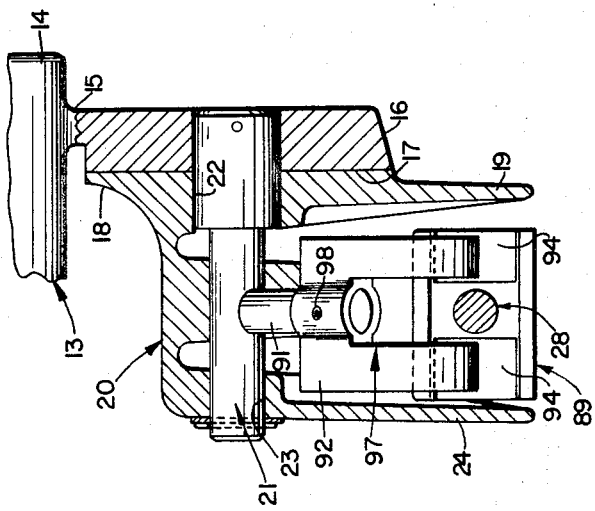
FIG. 4 is a vertical sectional view taken substantially on line 4—4 of FIG. 2.

As best seen in FIG. 2, spring biasing means 28 additionally comprises a coil compression spring 86 the outer end of which is guidingly supported by a cup-like washer 87 slidably supported by rod 83 and the inner end of which is guidingly supported by the cylindrical hub 88 of a cross arm abutment member 89 slidably supported by rod 83 and a bifurcated lever arm 91 fixed at the end remote from bifurcated end 92 to cross shaft 21 and formed at bifurcated end 92 with inturned rounded abutments 93 engageable in mating sockets 94 of cross arm member 89. While any suitable means may be employed to fix lever arm 91 to cross shaft 21, it is preferred to through drill shaft 21 to form a passage 95 to receive the upper end of lever arm 91 and to through drill shaft 21 and the upper end of lever arm 91 at right angles to passage 95 to receive a roll pin 96. The bifurcated end 92 of lever arm 91 is preferably formed by a cross arm member 97 pinned to the depending end of lever arm 91 by a roll pin 98 (FIG. 4).

From the foregoing description, it will be appreciated that compression spring 86 is effective to bias cross-shaft 21 clockwise as viewed in FIG. 2 to maintain motor driven saw means 13 in its uppermost rest position as illustrated in FIG. 1. It will also be appreciated that the opposite ends of compression spring 86 are supported in coaxial relation to guide rod 83 by the interfit between the ends of spring 86 and the hub 88 of cross arm member 89 and cup-like washer 87. As a consequence, fracture of any coil of spring 86 due to metal fatigue or other causes will result in the broken ends being supported in opposing relation by guide rod 83. As a consequence, the weight component of the motor driven saw means 13 acting to swing shaft 21 and arm 91 counterclockwise as viewed in FIG. 2 will bring the broken ends of spring 86 into abutting contact arresting downward movement of motor driven saw means 13 and preventing its movement into operating position. This automatic arresting of the downward movement of saw means 31 assures that the saw means 31 will not gravitate to its cutting position with resulting injury to the operator upon spring failure.

Referring for the moment to FIGS. 2 and 3, the solid portion 64a of arm 64 immediately beneath and opposing the under face of arcuate web 43 along its arcuate centerline is through apertured at 101 to freely receive the upstanding cylindrical boss 102 of a detent support member 103 bolted to solid portion 64a by bolt and lockwasher assemblies 104 threaded into tapped passages 104a. As best seen in FIG. 2, the upper end of boss 102 abuttingly slidingly engages the underface of arcuate web 43 and boss 102 is provided with a blind bore 105 opening through its upper end. The underface of web 43 at the point of intersection of its arcuate centerline and medial plane MP which bisects arcuate web 43 and at points 45° to either side of the point of intersection is provided with downwardly opening blind drilled bores 106 the outer ends of which are counterbored to define conical detent receiving recesses 107. These recesses located at the 0° and opposite 45° angular adjusted positions of arm 64 define the most frequently used miter cutting angles. To permit rapid setting to these angles, a spring biased ball detent 108 is mounted in blind bore 105 of detent support member 103 to slidingly traverse the underface of web 43 between and snap into recesses 107 to automatically locate arm 64 in the frequently used settings.

In order to set the arm at cutting angles between the frequently used settings, the inturned leg 66 of hook formation 65 is fitted with a plate-like pointer 109 adapted to cooperate with the angle indicia 111 (FIG. 1) of scale plate 48. To this end, the free end of leg 66 is inwardly notched at 112 to form a downwardly and inwardly sloping surface 113 (FIGS. 2 and 3) extending inwardly from one edge of leg 66 to a point slightly beyond the longitudinal medial plane MP to form an abutment wall 115. Abutment wall 115 is disposed to engage the opposing edge of a downardly inclined main body section 116 of plate-like pointer 109 overlying sloping surface 113 of leg 66 and formed at its innermost corner as seen in FIG. 3 with an arrowhead-like protuberance 117 the converging edges of which intersect along the longitudinal medial plane MP. The outer end of plate-like pointer 109 overlies the upper face of leg 66 and is secured thereto by a securing screw 118 (FIG. 3) threaded into a blind tapped opening (not shown) in leg 66. In order to positively lock arm 64 in any selected adjusted position, the inner end of leg 66 beyond abutment wall 115 is through apertured and threaded as shown at 119 (FIG. 3) to receive a knurled headed set screw 121 (FIGS. 1 and 2) adapted to bear against the outer marginal portion of the upper face of web 43 beyond scale plate 48. When set screw 121 is screwed home, web 43 is clampingly engaged between the end of screw 121 and the upper end face of boss 102 to positively secure arm 64 in its selected angular position. The upstanding portion of hook formation 65 is preferably through drilled and tapped at 120 (FIG. 2) to receive an outwardly extending hand grip member 122 to be grasped by the operator for swinging arm 64 to its various angular positions.

In order to properly support workpiece W relative to scale plate 48, a plate-like, upstanding guide fence 123 disposed in right angular relation to the longitudinal medial plane MP is fixedly screw fastened at 124 (FIGS. 1 and 2) adjacent its opposite ends to L-shaped support brackets 125 screw fastened to mounting pads 37 by securing screws 126 (FIG. 2) entered into rearmost tapped passages 127 provided in top walls 36. As best seen in FIGS. 1 and 2, guide fence 123 is provided with an upwardly opening slot 127 centered with respect to medial plane MP and of a width to freely pass the cutting blade 26 in all angularly adjusted positions of arm 64. In use, miter box 10 is preferably fitted with support block 27 by the purchaser who is supplied with securing screws 128 adapted to be passed through the paired drilled passages 127 provided in the forward portions of top walls 36.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A motorized miter box having a base structure comprising side walls joined at opposed upper corners by an arcuate forwardly protruding web-like run and further joined in spaced relation below said web-like run by diagonally directed ribs intersecting in the medial plane between said side walls to define a vertical journal bore; a support member journalled in said journal bore and having a first arm extending radially rearwardly from the axis of said journal bore formed to pivotally mount motor driven saw means for swinging movement from a normal rest position to and through a cutting zone terminating slightly above the plane defined by the upper faces of said side walls and an oppositely directed arm extending beneath and terminating beyond the forward edge of said arcuate web-run in an upstanding inturned hook-shaped end formation freely passing the arcuate marginal edge of said web-run, said inturned end of said hook-shaped end formation being through apertured and tapped in overlying relation to said upper marginal edge of said web-run and fitted with a set screw adapted to be selectively engaged with the upper marginal face of said web-run to secure said support member in any angularly adjusted position thereby to position said motor driven saw means for selectively cutting workpieces spanning said base structure side walls at a predetermined angle, and wherein said motor driven saw means is carried by a pivot shaft journalled in said first arm and coil compression spring biasing means, including a guide shaft extending lengthwise through the coils of said compression spring to support said compression spring in operative relation in event of spring failure, is provided to normally bias said motor driven saw means to its rest position.

2. The motorized miter box improvement of claim 1 wherein said first arm of said support member at its free end is formed to provide a housing having laterally spaced, upstanding side walls formed adjacent their upper ends with coaxially opposed journal passages and interconnected at their opposite ends by respective end walls formed at their lower ends with coaxially aligned axial passages; a cross shaft is journalled in said opposed side wall journal passages with its opposite ends protruding beyond said side walls and rotatably mounts between said side walls; a downwardly inclined arm terminating in a bifurcated free end disposed in straddling relation to said guide shaft and fixedly mounts on one protruding end a support arm mounting said motor driven saw means in position to swing said bifurcated end of said inclined arm axially along said guide shaft; said compression spring encloses said guide shaft between said bifurcated end of said downwardly inclined arm and the housing end wall toward which said bifurcated end swings under the influence of said motor driven saw means whereby in event of structural failure of the compression spring, said guide shaft will effectively support the spring coils in axial interfering relation so as to maintain a sufficient spring resistence to constrain downward movement of said motor driven saw means to prevent its gravitation to said cutting zone.

3. The motorized miter box of claim 2 wherein said motor driven saw means swings downwardly and forwardly relative to said base structure, said base structure side walls have respective paired, tapped, laterally aligned passages opening through their upper edges forwardly of said vertical journal bore adapted to receive respective securing screws for securing the opposite ends of a non-metallic workpiece support block in spanning relation to said side walls in the path of downward movement of said motor driven saw means to support a workpiece to be cut, and said compression spring means is designed to extablish the end of the cutting zone at a point slightly below the work support surface of said non-metallic workpiece support block.

4. The motorized miter box of claim 2 wherein said base structure side walls have respective laterally aligned passages opening through their upper edges rearwardly of said vertical journal bore adapted to receive respective securing screws for securing the opposite ends of a workpiece guide fence in spanning relation to said side walls, said guide fence having an upstanding workpiece abutment flange disposed to engage the rear face of said non-metallic workpiece support block and having a laterally centered through slot opening through its top edge and lying in the cutting plane of said saw blade.

* * * * *